US012790272B2

(12) United States Patent
Hsu et al.

(10) Patent No.: US 12,790,272 B2
(45) Date of Patent: Nov. 10, 2026

(54) POROUS MATERIAL AND METHOD OF FORMING THE SAME

(71) Applicant: INDUSTRIAL TECHNOLOGY RESEARCH INSTITUTE, Hsinchu (TW)

(72) Inventors: Chien-Hua Hsu, New Taipei City (TW); Ming-Hui Chang, Zhudong Township (TW); Tien-Heng Huang, Tainan City (TW); Chiung-Fang Liu, Taipei City (TW); Sheng-Min Yu, Taoyuan City (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 322 days.

(21) Appl. No.: 18/780,195

(22) Filed: Jul. 22, 2024

(65) Prior Publication Data

US 2025/0171358 A1 May 29, 2025

(30) Foreign Application Priority Data

Nov. 29, 2023 (TW) ................................ 112146214

(51) Int. Cl.

| | |
|---|---|
| ***C04B 28/08*** | (2006.01) |
| ***C04B 18/02*** | (2006.01) |
| ***C04B 18/167*** | (2023.01) |
| ***C04B 22/06*** | (2006.01) |
| ***C04B 38/00*** | (2006.01) |
| ***C04B 38/02*** | (2006.01) |
| ***C04B 40/02*** | (2006.01) |
| *C04B 103/42* | (2006.01) |
| *C04B 103/63* | (2006.01) |

(52) U.S. Cl.

CPC ............ *C04B 28/08* (2013.01); *C04B 18/027* (2013.01); *C04B 18/167* (2013.01); *C04B 22/062* (2013.01); *C04B 38/0006* (2013.01); *C04B 38/0054* (2013.01); *C04B 38/02* (2013.01); *C04B 40/0268* (2013.01); *C04B 2103/42* (2013.01); *C04B 2103/63* (2013.01); *C04B 2201/20* (2013.01); *C04B 2201/32* (2013.01); *C04B 2201/50* (2013.01)

(58) Field of Classification Search

None

See application file for complete search history.

(56) References Cited

U.S. PATENT DOCUMENTS

| | | | |
|---|---|---|---|
| 9,932,269 B2 | 4/2018 | Zubrod | |
| 2007/0040307 A1 | 2/2007 | Lee et al. | |
| 2021/0221746 A1* | 7/2021 | Chang | C04B 38/0009 |

FOREIGN PATENT DOCUMENTS

| | | |
|---|---|---|
| CN | 1085618 C | 5/2002 |
| CN | 100337976 C | 9/2007 |
| CN | 101343155 B | 7/2011 |
| CN | 109608193 A | 4/2019 |
| CN | 111943714 A | 11/2020 |
| CN | 112898045 A | 6/2021 |
| CN | 113480324 A | 10/2021 |
| TW | 394750 B | 6/2000 |
| TW | 200909376 A | 3/2009 |
| TW | 201242925 A | 11/2012 |
| TW | 201317196 A1 | 5/2013 |
| TW | I445871 B | 7/2014 |
| TW | I465300 B | 12/2014 |
| TW | I477476 B | 3/2015 |
| TW | I700260 B | 8/2020 |
| TW | I708849 B | 11/2020 |
| TW | 202304833 A | 2/2023 |
| TW | I796036 B | 3/2023 |
| WO | WO 97/10179 A1 | 3/1997 |
| WO | WO 2020/063203 A1 | 4/2020 |

OTHER PUBLICATIONS

De Gennaro et al., "Campanian Ignimbrite as raw material for lightweight aggregates", Applied Clay Sciences, ELSEVIER, 2007, vol. 37, Issues 1-2, pp. 115-126.
De' Gennaro et al., "Zeolitic tuffs as raw materials for lightweight aggregates", Applied Clay Science, ELSEVIER, 2004, vol. 25, Issues 1-2, pp. 71-81.
Ducman et al., "Lightweight aggregate based on waste glass and its alkali-silica reactivity", Cement and Concrete Research, 2002, vol. 32, Issue 2, pp. 223-226.
Fragoulis et al., "Characterization of lightweight aggregates produced with clayey diatomite rocks originating from Greece", Materials Characterization, ELSEVIER, 2004, vol. 53, Issues 2-4, pp. 307-316.
Show et al., "Lightweight Aggregates from Industrial Sludge-Marine Clay Mixes", J. Environ. Eng., 2005, vol. 131, No. 7, pp. 1106-1113.
TW Allowance issued in corresponding TW Application No. 112146214 dated Jul. 10, 2024.
Extended European Search Report for European Application No. 24191524.8, dated Jan. 28, 2025.
Yildirim et al., "Chemical, Mineralogical, and Morphological Properties of Steel Slag", Advances in Civil Engineering, vol. 2011, Jan. 1, 2011, XP055720600, pp. 1-13.

* cited by examiner

*Primary Examiner* — Stefanie J Cohen
(74) *Attorney, Agent, or Firm* — Birch, Stewart, Kolasch & Birch, LLP

(57) ABSTRACT

A porous structure includes 3 wt % to 4.2 wt % of Mg, 14 wt % to 18 wt % of Ca, 12 wt % to 15 wt % of Si, 0.8 wt % to 1.5 wt % of Al, 0.1 wt % to 0.3 wt % of K, 0.4 wt % to 2 wt % of Fe, 7 wt % to 8.5 wt % of Na, 4.8 wt % to 7.6 wt % of B, and 48 wt % to 52 wt % of O.

12 Claims, No Drawings

POROUS MATERIAL AND METHOD OF FORMING THE SAME

CROSS REFERENCE TO RELATED APPLICATIONS

The present application is based on, and claims priority from, Taiwan Application Serial Number 112146214, filed on Nov. 29, 2023, the disclosure of which is hereby incorporated by reference herein in its entirety.

TECHNICAL FIELD

The technical field relates to a porous material, and in particular it relates to a porous and light-weight material generated by reusing waste, and a method of forming the porous and light-weight material.

BACKGROUND

According to recent steel industry statistics, the global steel industry produces about 500 million tons of basic-oxygen-furnace slag (BOFS) and electric arc furnace slag (EAFS) per year, and the expected output of the derived reducing slag and the waste flame retardant material is also quite high. The derived reducing slag and the waste flame retardant material contain too much free calcium oxide (f-CaO) and free magnesium oxide (f-MgO). After coming into contact with water, f-CaO and f-MgO may generate calcium hydroxide ($Ca(OH)_2$) and magnesium hydroxide ($Mg(OH)_2$), respectively, i.e. their volume expands to approximately one to three times their original volume. Because the quality of the reducing slag and the waste flame retardant material is difficult to keep stable, thereby being difficult to reuse. The conventional method for treating reducing slag and waste flame retardant material is adding a curing agent to it and then burying it, which is time-consuming, laborious, and costly.

A novel method is called for treating reducing slag and waste flame retardant material, even reusing them to prepare materials for construction engineering.

SUMMARY

One embodiment of the disclosure provides a porous material, including 3 wt % to 4.2 wt % of Mg; 14 wt % to 18 wt % of Ca; 12 wt % to 15 wt % of Si; 0.8 wt % to 1.5 wt % of Al; 0.1 wt % to 0.3 wt % of K; 0.4 wt % to 2 wt % of Fe; 7 wt % to 8.5 wt % of Na; 4.8 wt % to 7.6 wt % of B; and 48 wt % to 52 wt % of O.

In some embodiments, the porous material has a crystalline phase of $Na_2MgSiO_4$, $Na_2Si(Si_2O_7)$, $CaMgSi_2O_6$, MgO, $CaSiO_3$, or a combination thereof.

In some embodiments, the porous material has a honeycomb structure with a porosity of 13% to 25% and a pore size of 5 micrometers to 450 micrometers.

In some embodiments, the porous material has a compressive strength of 200 kgf/cm$^2$ to 400 kgf/cm$^2$, a density of 1.5 g/cm$^3$ to 1.65 g/cm$^3$, and a water absorption of 5% to 20%.

In some embodiments, the porous material has a thermal conductivity of 0.4 W/m·K to 0.8 W/m·K, and the porous material has a flame resistance and thermal insulation to a flame of 1000° C. to 1200° C.

One embodiment of the disclosure provides a method of forming a porous material, including: mixing raw materials, an alkaline activator and a foaming agent to form a mixture, wherein the raw materials includes 40 wt % to 45 wt % of reducing slag, 10 wt % to 15 wt % of waste flame retardant material, and 40 wt % to 45 wt % of waste glass; molding the mixture to form a green body; and sintering the green body to form the described porous material, wherein the sintering step is performed at a temperature of 600° C. to 800° C. for a period of 1 hour to 4 hours.

In some embodiments, the reducing slag includes 1 wt % to 10 wt % of Mg, 30 wt % to 45 wt % of Ca, 5 wt % to 20 wt % of Si, 1 wt % to 5 wt % of Al, 0.5 wt % to 1.5 wt % of B, 40 wt % to 50 wt % of O, 0.01 wt % to 0.1 wt % of K, 0.1 wt % to 0.5 wt % of Na, and 0.1 wt % to 1 wt % of Fe.

In some embodiments, the waste flame retardant material includes 20 wt % to 30 wt % of Mg, 20 wt % to 30 wt % of Ca, 1 wt % to 5 wt % of Si, 3 wt % to 4 wt % of Al, 35 wt % to 45 wt % of O, 0.1 wt % to 1 wt % of B, 0.01 wt % to 1 wt % of Na, 0.01 wt % to 1 wt % of K, and 0.5 wt % to 1 wt % of Fe.

In some embodiments, the waste glass includes 45 wt % to 55 wt % of O, 20 wt % to 30 wt % of Si, 1 wt % to 5 wt % of B, 0.1 wt % to 1 wt % of Fe, 1 wt % to 5 wt % of Al, 0.1 wt % to 1 wt % of K, 0.1 wt % to 1 wt % of Mg, 5 wt % to 10 wt % of Na, and 5 wt % to 10 wt % of Ca.

In some embodiments, the alkaline activator includes sodium hydroxide, potassium hydroxide, calcium oxide, sodium carbonate, sodium silicate, or a combination thereof, and the foaming agent includes boric acid, sodium bicarbonate ($NaHNO_3$), sodium perborate ($NaBO_3$), borax, silicon carbide (SiC) or a combination thereof.

In some embodiments, the raw materials and the alkaline activator have a weight ratio of 100:1 to 100:10, and the raw materials and the foaming agent have a weight ratio of 100:10 to 100:15.

In some embodiments, the reducing slag is a by-product of the metallurgical industry, and the waste flame retardant material is a waste product from high-temperature industrial equipment.

A detailed description is given in the following embodiments.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details.

One embodiment of the disclosure provides a method of forming a porous material, including: mixing raw materials, an alkaline activator and a foaming agent to form a mixture, wherein the raw materials includes 40 wt % to 45 wt % of reducing slag, 10 wt % to 15 wt % of waste flame retardant material, and 40 wt % to 45 wt % of waste glass. In some embodiments, the reducing slag is a by-product of the metallurgical industry, and the waste flame retardant material is a waste product of high-temperature industrial equipment.

In some embodiments, the reducing slag includes 1 wt % to 10 wt % of Mg, 30 wt % to 45 wt % of Ca, 5 wt % to 20 wt % of Si, 1 wt % to 5 wt % of Al, 0.5 wt % to 1.5 wt % of B, 40 wt % to 50 wt % of O, 0.01 wt % to 0.1 wt % of K, 0.1 wt % to 0.5 wt % of Na, and 0.1 wt % to 1 wt % of Fe. As known from the above composition, the reducing slag contains a large amount of calcium.

In some embodiments, the reducing slag may include, for example, 2 wt %, 3 wt %, 5 wt %, or 8 wt % of Mg, but is not limited thereto. The reducing slag may include, for example, 32 wt %, 35 wt %, 38 wt %, 40 wt %, or 42 wt % of Ca, but is not limited thereto. The reducing slag may include, for example, 7 wt %, 10 wt %, 12 wt %, 15 wt %, or 18 wt % of Si, but is not limited thereto. The reducing slag may include, for example, 1.2 wt %, 2 wt %, 3 wt %, or 4.5 wt % of Al, but is not limited thereto. The reducing slag may include, for example, 0.75 wt %, 1.0 wt %, 1.25 wt %, or 1.45 wt % of B, but is not limited thereto. The reducing slag may include, for example, 42 wt %, 43 wt %, 45 wt %, or 48 wt % of O, but is not limited thereto. The reducing slag may include, for example, 0.02 wt %, 0.05 wt %, or 0.075 wt % of K, but is not limited thereto. The reducing slag may include, for example, 0.15 wt %, 0.2 wt %, 0.3 wt %, or 0.45 wt % of Na, but is not limited thereto. The reducing slag may include, for example, 0.2 wt %, 0.3 wt %, 0.5 wt %, 0.75 wt %, or 0.8 wt % of Fe, but is not limited thereto.

In some embodiments, the waste flame retardant material includes 20 wt % to 30 wt % of Mg, 20 wt % to 30 wt % of Ca, 1 wt % to 5 wt % of Si, 3 wt % to 4 wt % of Al, 35 wt % to 45 wt % of O, 0.1 wt % to 1 wt % of B, 0.01 wt % to 1 wt % of Na, 0.01 wt % to 1 wt % of K, and 0.5 wt % to 1 wt % of Fe. As known from the above composition, the waste flame retardant material contains a large amount of calcium and magnesium.

In some embodiments, the waste flame retardant material may include, for example, 22 wt %, 25 wt %, 27 wt %, or 29 wt % of Mg, but is not limited thereto. The waste flame retardant material may include, for example, 22.5 wt %, 25 wt %, 27.5 wt %, or 29 wt % of Ca, but is not limited thereto. The waste flame retardant material may include, for example, 1.5 wt %, 1.75 wt %, 2 wt %, 3 wt %, or 4.5 wt % of Si, but is not limited thereto. The waste flame retardant material may include, for example, 3.2 wt %, 3.5 wt %, 3.75 wt %, or 3.9 wt % of Al, but is not limited thereto. The waste flame retardant material may include, for example, 37.5 wt %, 40 wt %, 42.5 wt %, or 44 wt % of O, but is not limited thereto. The waste flame retardant material may include, for example, 0.15 wt %, 0.25 wt %, 0.5 wt %, or 0.75 wt % of B, but is not limited thereto. The waste flame retardant material may include, for example, 0.05 wt %, 0.1 wt %, 0.5 wt %, or 0.75 wt % of Na, but is not limited thereto. The waste flame retardant material may include, for example, 0.0.5 wt %, 0.1 wt %, 0.5 wt %, or 0.75 wt % of K, but is not limited thereto. The waste flame retardant material may include, for example, 0.6 wt %, 0.75 wt %, or 0.9 wt % of Fe, but is not limited thereto.

In some embodiments, the waste glass includes 45 wt % to 55 wt % of O, 20 wt % to 30 wt % of Si, 1 wt % to 5 wt % of B, 0.1 wt % to 1 wt % of Fe, 1 wt % to 5 wt % of Al, 0.1 wt % to 1 wt % of K, 0.1 wt % to 1 wt % of Mg, 5 wt % to 10 wt % of Na, and 5 wt % to 10 wt % of Ca. As known from the above composition, the waste glass contains a large amount of silicon.

In some embodiments, the waste glass may include, for example, 47.5 wt %, 50 wt %, 52.5 wt %, or 54 wt % of O but is not limited thereto. The waste glass may include, for example, 22.5 wt %, 25 wt %, or 27.5 wt % of Si, but is not limited thereto. The waste glass may include, for example, 1.25 wt %, 1.5 wt %, 2.5 wt %, 3.75 wt %, or 4.5 wt % of B, but is not limited thereto. The waste glass may include, for example, 0.25 wt %, 0.5 wt %, or 0.75 wt % of Fe, but is not limited thereto. The waste glass may include, for example, 1.25 wt %, 1.75 wt %, 2.5 wt %, 3.75 wt %, or 4.5 wt % of Al, but is not limited thereto. The waste glass may include, for example, 0.25 wt %, 0.5 wt %, 0.75 wt % of K, but is not limited thereto. The waste glass may include, for example, 0.25 wt %, 0.5 wt %, 0.75 wt %, or 0.85 wt % of Mg, but is not limited thereto. The waste glass may include, for example, 5.5 wt %, 7.5 wt %, 8.5 wt %, or 9.5 wt % of Na, but is not limited thereto. The waste glass may include, for example, 5.5 wt %, 7.5 wt %, 8.5 wt %, or 9.5 wt % of Ca, but is not limited thereto.

Subsequently, the mixture is molded to form a green body, and the green body is then sintered to form a porous material. The sintering step is performed at a temperature of 600° C. to 800° C., such as 650° C., 675° C., 700° C., or 750° C., but is not limited thereto. The sintering step is performed for a period of 1 hour to 4 hours, such as 1.5 hours, 2 hours, 2.5 hours, 3 hours, or 3.5 hours, but is not limited thereto. If the sintering temperature is too low or the sintering period is too short, the product will be too dense (it cannot be light-weight) and an insufficient compressive strength. If the sintering temperature is too high or the sintering period is too long, the product will have a water absorption that was too high and an insufficient compressive strength.

In some embodiments, the alkaline activator includes sodium hydroxide, potassium hydroxide, calcium oxide, sodium carbonate, sodium silicate, or a combination thereof, and the foaming agent includes boric acid, sodium bicarbonate ($NaHNO_3$), sodium perborate ($NaBO_3$), borax, silicon carbide (SiC) or a combination thereof.

In some embodiments, the raw materials and the alkaline activator have a weight ratio of 100:1 to 100:10, such as 100:2, 100:3, 100:5, 100:7, or 100:8.5, but is not limited thereto. The raw materials and the foaming agent have a weight ratio of 100:10 to 100:15, such as 100:10, 100:12.5, or 100:15, but is not limited thereto. If the alkaline activator amount is too low, it cannot cause inorganic polymerization of raw materials to generate the honeycomb-shaped porous structure. If the alkaline activator amount is too high, a whitening phenomenon will occur and excessive sodium bicarbonate will be formed to reduce the compressive strength of the porous material. If the foaming agent amount is too low, the product will be too dense (it cannot be made light-weight) and an insufficient compressive strength. If the foaming agent amount is too high, the product will have a water absorption that was too high and an insufficient compressive strength.

In some embodiments, the porous material formed by the described method includes 3 wt % to 4.2 wt % of Mg; 14 wt % to 18 wt % of Ca; 12 wt % to 15 wt % of Si; 0.8 wt % to 1.5 wt % of Al; 0.1 wt % to 0.3 wt % of K; 0.4 wt % to 2 wt % of Fe; 7 wt % to 8.5 wt % of Na; 4.8 wt % to 7.6 wt % of B; and 48 wt % to 52 wt % of O.

In some embodiments, the porous material may include, for example, 3.1 wt %, 3.25 wt %, 3.75 wt %, 4.0 wt %, or 4.15 wt % of Mg, but is not limited thereto. The porous material may include, for example, 14.5 wt %, 15 wt %, 15.5 wt %, 16.5 wt %, 17 wt %, 17.5 wt %, or 17.75 wt % of Ca, but is not limited thereto. The porous material may include, for example, 12.5 wt %, 13 wt %, 13.5 wt %, 14 wt %, or 14.5 wt % of Si, but is not limited thereto. The porous material may include, for example, 0.85 wt %, 1.0 wt %, 1.15 wt %, 1.3 wt %, or 1.45 wt % of Al, but is not limited thereto. The porous material may include, for example, 0.15 wt %, 0.2 wt %, 0.25 wt %, or 0.28 wt % of K, but is not limited thereto. The porous material may include, for example, 0.45 wt %, 0.5 wt %, 1.0 wt %, 1.25 wt %, 1.5 wt %, or 1.75 wt % of Fe, but is not limited thereto. The porous material may include, for example, 7.25 wt %, 7.5 wt %, 7.75 wt %, 8.0 wt %, or 8.25 wt % of Na, but is not limited thereto. The porous material may include, for example, 5.0 wt %, 5.5 wt %, 6.0 wt %, 6.5 wt %, 7.0 wt %, or 7.5 wt % of B, but is not limited thereto. The porous material may include, for example, 48.5 wt %, 49.0 wt %, 49.5 wt %, 50.0 wt %, or 51.5 wt % of O, but is not limited thereto. If Mg and Ca amounts in the above porous material are too low, they cannot serve as a flux to lower the melting point of sintering. If Mg and Ca amounts are too high, it will be predicted that excessive expansion of magnesium hydroxide and calcium hydroxide will be formed. Furthermore, if Si, Al, and Na amounts are too low in the porous material, it cannot efficiently form a stable framework structure. If Si, Al, and Na amounts are too high, it will be difficult to form a charge balanced framework structure.

In some embodiments, the porous material has a crystalline phase of $Na_2MgSiO_4$, $Na_2Si(Si_2O_7)$, $CaMgSi_2O_6$, MgO, $CaSiO_3$, or a combination thereof. The crystalline phase is beneficial to improve the compression strength of the porous material.

In some embodiments, the porous material has a honeycomb structure with a porosity of 13% to 25% and a pore size of 5 micrometers to 450 micrometers, such as 5 micrometers to 10 micrometers, 10 micrometers to 15 micrometers, 15 micrometers to 25 micrometers, 25 micrometers to 150 micrometers, 20 micrometers to 100 micrometers, 50 micrometers to 200 micrometers, 150 micrometers to 450 micrometers, or 240 micrometers to 450 micrometers, but is not limited thereto. If the porosity of the porous material is too low, the effect of light-weight material cannot be achieved. If the porosity of the porous material is too high, the structural strength will be decreased. If the pore size of the porous material is too small, the porous material will be free of the flame resistance and thermal insulation properties. If the pore size of the porous material is too large, the porous material having an insufficient strength will be difficult to process.

In some embodiments, the porous material has a compressive strength of 200 $kgf/cm^2$ to 400 $kgf/cm^2$, such as 210 $kgf/cm^2$, 250 $kgf/cm^2$, 275 $kgf/cm^2$, 300 $kgf/cm^2$, 350 $kgf/cm^2$, or 375 $kgf/cm^2$, but is not limited thereto. The porous material may have a density of 1.5 $g/cm^3$ to 1.65 $g/cm^3$, such as 1.52 $g/cm^3$, 1.55 $g/cm^3$, 1.58 $g/cm^3$, 1.6 $g/cm^3$, or 1.62 $g/cm^3$, but is not limited thereto. The porous material may have a water absorption of 5% to 20%, such as 7.5%, 8%, 9.5%, 10%, 12.5%, 15%, or 17.5%, but is not limited thereto. If the compressive strength of the porous material is insufficient, the construction materials such as sand and stone cannot be replaced with the porous material. If the density of the porous material is too low, the strength of the porous material will be insufficient and the porous material will be difficult to process. If the density of the porous material is too high, the effect of light-weight cannot be achieved.

In some embodiments, the porous material has a thermal conductivity of 0.4 W/m·K to 0.8 W/m·K, such as 0.5 W/m·K, 0.6 W/m·K, or 0.7 W/m·K, but is not limited thereto. The porous material has a flame resistance and thermal insulation to a flame of 1000° C. to 1200° C. (e.g. 1100° C.). If the thermal conductivity of the porous material is too high, the porous material will not have the thermal insulation effect.

The honeycomb-shaped porous material may serve as a light-weight aggregate for construction industry, which may greatly lower construction cost and address the treatment issue of the reducing slag, the waste flame retardant material, and the waste glass.

Below, exemplary embodiments will be described in detail so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLES

In one Example, the reducing slag included 45.61 wt % of O, 0.94 wt % of B, 0.18 wt % of Fe, 1.08 wt % of Al, 10.91 wt % of Si, 0.01 wt % of K, 0.16 wt % of Na, 38.51 wt % of Ca, and 2.59 wt % of Mg. The waste flame retardant material included 43.92 wt % of O, 0.51 wt % of B, 0.73 wt % of Fe, 3.66 wt % of Al, 3.17 wt % of Si, 0.04 wt % of K, 0.04 wt % of Na, 25.67 wt % of Ca, and 22.28 wt % of Mg. The waste glass included 51.09 wt % of O, 1.32 wt % of B, 0.24 wt % of Fe, 1.18 wt % of Al, 28.79 wt % of Si, 0.53 wt % of K, 8.88 wt % of Na, 7.11 wt % of Ca, and 0.82 wt % of Mg.

In another Example, the reducing slag included 45.88 wt % of O, 0.97 wt % of B, 0.16 wt % of Fe, 1.01 wt % of Al, 10.55 wt % of Si, 0.02 wt % of K, 0.15 wt % of Na, 38.44 wt % of Ca, and 2.52 wt % of Mg. The waste flame retardant material included 43.88 wt % of O, 0.53 wt % of B, 0.76 wt % of Fe, 3.45 wt % of Al, 3.22 wt % of Si, 0.05 wt % of K, 0.06 wt % of Na, 25.81 wt % of Ca, and 22.33 wt % of Mg. The waste glass included 51.12 wt % of O, 1.28 wt % of B, 0.29 wt % of Fe, 1.22 wt % of Al, 28.81 wt % of Si, 0.56 wt % of K, 8.97 wt % of Na, 7.21 wt % of Ca, and 0.88 wt % of Mg.

In still another Example, the reducing slag included 45.55 wt % of O, 0.91 wt % of B, 0.13 wt % of Fe, 1.04 wt % of Al, 10.78 wt % of Si, 0.06 wt % of K, 0.12 wt % of Na, 38.49 wt % of Ca, and 2.54 wt % of Mg. The waste flame retardant material included 43.87 wt % of O, 0.49 wt % of B, 0.68 wt % of Fe, 3.68 wt % of Al, 3.25 wt % of Si, 0.09 wt % of K, 0.07 wt % of Na, 25.74 wt % of Ca, and 22.35 wt % of Mg. The waste glass included 51.12 wt % of O, 1.35 wt % of B, 0.26 wt % of Fe, 1.19 wt % of Al, 28.81 wt % of Si, 0.55 wt % of K, 8.89 wt % of Na, 7.16 wt % of Ca, and 0.85 wt % of Mg.

The element ratios of the reducing slag, the waste flame retardant material, the waste glass, and the products in following Examples and Comparative Examples were measured by an X-ray fluorescence spectrometer (XRF). The density of the products in Examples and Comparative Examples was measured according to the standard ASTM C373. The water absorption of the products in Examples and Comparative Examples was measured according to the standard ASTM C12. The compressive strength of the products in Examples and Comparative Examples was measured according to the standard ASTM C109. The porosity of the products in Examples and Comparative Examples was measured according to the standard ASTM C29. The pore size of the products in Examples and Comparative Examples was measured by SEM. The thermal conductivity of the products in Examples and Comparative Examples were measured according to the standard ASTM C109. The flame retardant property of the products in Examples and Comparative Examples was measured according to the standard ASTM E119.

Example 1

270 g of the reducing slag, 90 g of the waste flame retardant material, and 258 g of the waste glass were selected as raw materials. 210 mL of 4M NaOH solution (containing 36 g of NaOH) was prepared to serve as an alkaline activator. The raw materials and the alkaline activator were mixed, and 80 g of boric acid (about 13%) serving as a foaming agent was added to the mixture and uniformly stirred. The mixture was molded and then pressed by 3500 psi to shape, then dried in shade for one day, then dried in an oven at 60° C., and then sintered at 600° C. for 4 hours to obtain a porous material. The porous material had a density of 1.62 g/cm$^3$, a water absorption of 8.88%, a compressive strength of 206 kgf/cm$^2$, a porosity of 13.8%, a pore size of 5.76 micrometers to 10 micrometers, and a thermal conductivity of 0.75 W/m·K. The porous material included 52.01 wt % of O, 7.58 wt % of B, 0.47 wt % of Fe, 0.87 wt % of Al, 13.29 wt % of Si, 0.19 wt % of K, 8.06 wt % of Na, 14.42 wt % of Ca, and 3.07 wt % of Mg. As known from the XRD analysis, the porous material had crystalline phases of $CaMgSi_2O_6$, MgO, and $CaSiO_3$.

Example 2

270 g of the reducing slag, 90 g of the waste flame retardant material, and 258 g of the waste glass were selected as raw materials. 210 mL of 4M NaOH solution (containing 36 g of NaOH) was prepared to serve as an alkaline activator. The raw materials and the alkaline activator were mixed, and 80 g of boric acid (about 13%) serving as a foaming agent was added to the mixture and uniformly stirred. The mixture was molded and then pressed by 3500 psi to shape, then dried in shade for one day, then dried in an oven at 60° C., and then sintered at 650° C. for 4 hours to obtain a porous material. The porous material had a density of 1.6 g/cm$^3$, a water absorption of 7.45%, a compressive strength of 272 kgf/cm$^2$, a porosity of 16.1%, a pore size of 16.36 micrometers to 22.73 micrometers, and a thermal conductivity of 0.68 W/m·K. The porous material included 50.39 wt % of O, 4.98 wt % of B, 0.51 wt % of Fe, 1.09 wt % of Al, 14.69 wt % of Si, 0.22 wt % of K, 7.53 wt % of Na, 16.58 wt % of Ca, and 3.95 wt % of Mg. As known from the XRD analysis, the porous material had crystalline phases of $Na_2MgSiO_4$, $Na_2Si(Si_2O_7)$, $CaMgSi_2O_6$, MgO, and $CaSiO_3$.

Example 3

270 g of the reducing slag, 90 g of the waste flame retardant material, and 258 g of the waste glass were selected as raw materials. 210 mL of 4M NaOH solution (containing 36 g of NaOH) was prepared to serve as an alkaline activator. The raw materials and the alkaline activator were mixed, and 80 g of boric acid (about 13%) serving as a foaming agent was added to the mixture and uniformly stirred. The mixture was molded and then pressed by 3500 psi to shape, then dried in shade for one day, then dried in an oven at 60° C., and then sintered at 700° C. for 4 hours to obtain a porous material. The porous material had a density of 1.5 g/cm$^3$, a water absorption of 9.75%, a compressive strength of 370 kgf/cm$^2$, a porosity of 19.3%, a pore size of 163 micrometers to 439 micrometers, and a thermal conductivity of 0.51 W/m·K. The porous material included 49.62 wt % of O, 5.30 wt % of B, 0.49 wt % of Fe, 1.13 wt % of Al, 13.69 wt % of Si, 0.23 wt % of K, 7.67 wt % of Na, 17.69 wt % of Ca, and 4.14 wt % of Mg. As known from the XRD analysis, the porous material had crystalline phases of $Na_2MgSiO_4$, $Na_2Si(Si_2O_7)$, $CaMgSi_2O_6$, MgO, and $CaSiO_3$.

Example 4

270 g of the reducing slag, 90 g of the waste flame retardant material, and 258 g of the waste glass were selected as raw materials. 210 mL of 4M NaOH solution (containing 36 g of NaOH) was prepared to serve as an alkaline activator. The raw materials and the alkaline activator were mixed, and 80 g of boric acid (about 13%) serving as a foaming agent was added to the mixture and uniformly stirred. The mixture was molded and then pressed by 3500 psi to shape, then dried in shade for one day, then dried in an oven at 60° C., and then sintered at 800° C. for 4 hours to obtain a porous material. The porous material had a density of 1.59 g/cm$^3$, a water absorption of 17.21%, a compressive strength of 217 kgf/cm$^2$, a porosity of 23.3%, a pore size of 249 micrometers to 436.36 micrometers, and a thermal conductivity of 0.47 W/m·K. The porous material included 51.07 wt % of O, 5.54 wt % of B, 1.66 wt % of Fe, 0.92 wt % of Al, 12.53 wt % of Si, 0.17 wt % of K, 7.75 wt % of Na, 17.05 wt % of Ca, and 3.27 wt % of Mg. As known from the XRD analysis, the porous material had crystalline phases of $Na_2Si(Si_2O_7)$, $CaMgSi_2O_6$, and $CaSiO_3$.

Comparative Example 1

270 g of the reducing slag, 90 g of the waste flame retardant material, and 258 g of the waste glass were selected as raw materials. 210 mL of 4M NaOH solution (containing 36 g of NaOH) was prepared to serve as an alkaline activator. The raw materials and the alkaline activator were mixed and uniformly stirred. The mixture was molded and then pressed by 3500 psi to shape, then dried in shade for one day, then dried in an oven at 60° C., and then sintered at 600° C. for 4 hours to obtain a non-porous material. The non-porous material had a density of 1.86 g/cm$^3$, a water absorption of 20.07%, and a compressive strength of 43 kgf/cm$^2$. As known from Comparative Example 1, the non-porous material formed without a foaming agent had a density that was too high and a compressive strength that was too low.

Comparative Example 2

270 g of the reducing slag, 90 g of the waste flame retardant material, and 258 g of the waste glass were selected as raw materials. 210 mL of 4M NaOH solution (containing 36 g of NaOH) was prepared to serve as an alkaline activator. The raw materials and the alkaline activator were mixed, and 18.5 g of boric acid (about 3%) serving as a foaming agent was added to the mixture and uniformly stirred. The mixture was molded and then pressed by 3500 psi to shape, then dried in shade for one day, then dried in an oven at 60° C., and then sintered at 600° C. for 4 hours to obtain a porous material. The porous material had a density of 1.82 g/cm$^3$, a water absorption of 19.96%, and a compressive strength of 68 kgf/cm$^2$. As known from Comparative Example 2, the porous material formed with too little foaming agent had a density that was too high and a compressive strength that was too low.

Comparative Example 3

270 g of the reducing slag, 90 g of the waste flame retardant material, and 258 g of the waste glass were selected as raw materials. 210 mL of 4M NaOH solution (containing 36 g of NaOH) was prepared to serve as an alkaline activator. The raw materials and the alkaline activator were mixed, and 43.3 g of boric acid (about 7%) serving as a foaming agent was added to the mixture and uniformly stirred. The mixture was molded and then pressed by 3500 psi to shape, then dried in shade for one day, then dried in an oven at 60° C., and then sintered at 600° C. for 4 hours to obtain a porous material. The porous material had a density of 1.68 g/cm$^3$, a water absorption of 17.22%, and a compressive strength of 58 kgf/cm$^2$. As known from Comparative Example 3, the porous material formed with too little foaming agent had a density that was too high and a compressive strength that was too low.

Comparative Example 4

270 g of the reducing slag, 90 g of the waste flame retardant material, and 258 g of the waste glass were selected as raw materials. 210 mL of 4M NaOH solution (containing 36 g of NaOH) was prepared to serve as an alkaline activator. The raw materials and the alkaline activator were mixed, and 123.6 g of boric acid (about 20%) serving as a foaming agent was added to the mixture and uniformly stirred. The mixture was molded and then pressed by 3500 psi to shape, then dried in shade for one day, then dried in an oven at 60° C., and then sintered at 600° C. for 4 hours to obtain a porous material. The porous material had a density of 1.49 g/cm$^3$, a water absorption of 28.33%, and a compressive strength of 123 kgf/cm$^2$. As known from Comparative Example 3, the porous material formed with too much foaming agent had a density that was too low and a compressive strength that was too low.

Comparative Example 5

270 g of the reducing slag, 90 g of the waste flame retardant material, and 258 g of the waste glass were selected as raw materials. 210 mL of 4M NaOH solution (containing 36 g of NaOH) was prepared to serve as an alkaline activator. The raw materials and the alkaline activator were mixed, and 80 g of boric acid (about 13%) serving as a foaming agent was added to the mixture and uniformly stirred. The mixture was molded and then pressed by 3500 psi to shape, then dried in shade for one day, then dried in an oven at 60° C., and then placed at room temperature for 7 days to obtain a material. The material had a density of 1.81 g/cm$^3$, a water absorption of 15.11%, a compressive strength of 49 kgf/cm$^2$, and a thermal conductivity of 1.14 W/m·K. There was no obvious pore formed in the material. The material without any obvious pore (hereinafter referred as non-porous material) included 53.79 wt % of O, 3.14 wt % of B, 0.29 wt % of Fe, 0.95 wt % of Al, 16.7 wt % of Si, 0.21 wt % of K, 6.50 wt % of Na, 16.17 wt % of Ca, and 2.13 wt % of Mg. As known from the XRD analysis, the non-porous material had crystalline phases of $SiO_2$, MgO, and $CaSiO_3$. As known from Comparative Example 5, the non-sintered product such as the non-porous material had a density that was too high and a compressive strength that was too low.

Flame Retardant and Thermal Insulation Test

The porous material in Example 3 and the non-porous material in Comparative Example 5 were burned by flame of 1100° C. for 30 minutes, respectively. The porous material in Example 3 was heated to 158° C., and its appearance was changed a little. The non-porous material in Comparative Example 5 was heated to 262° C., and its appearance had obvious burning marks. Accordingly, the porous material in Example 3 was flame retardant and thermal insulation to the flame of 1100° C.

Comparative Example 6

270 g of the reducing slag, 90 g of the waste flame retardant material, and 258 g of the waste glass were selected as raw materials. 210 mL of 4M NaOH solution (containing 36 g of NaOH) was prepared to serve as an alkaline activator. The raw materials and the alkaline activator were mixed, and 80 g of boric acid (about 13%) serving as a foaming agent was added to the mixture and uniformly stirred. The mixture was molded and then pressed by 3500 psi to shape, then dried in shade for one day, then dried in an oven at 60° C., and then sintered at 500° C. for 4 hours to obtain a porous material. The porous material had a density of 1.76 g/cm$^3$, a water absorption of 14.88%, a compressive strength of 115 kgf/cm$^2$, a porosity of 12.5%, a pore size of 2.31 micrometers to 5.01 micrometers, and a thermal conductivity of 1.089 W/m·K. The porous material included 50.32 wt % of O, 4.52 wt % of B, 0.36 wt % of Fe, 0.91 wt % of Al, 16.81 wt % of Si, 0.22 wt % of K, 6.66 wt % of Na, 17.72 wt % of Ca, and 2.44 wt % of Mg. As known from the XRD analysis, the porous material had crystalline phases of $CaMgSi_2O_6$, MgO, and $CaSiO_3$. As known from Comparative Example 6, the product sintered at too low a temperature had a density that was too high and a compressive strength that was too low.

Comparative Example 7

270 g of the reducing slag, 90 g of the waste flame retardant material, and 258 g of the waste glass were selected as raw materials. 210 mL of 4M NaOH solution (containing 36 g of NaOH) was prepared to serve as an alkaline activator. The raw materials and the alkaline activator were mixed, and 80 g of boric acid (about 13%) serving as a foaming agent was added to the mixture and uniformly stirred. The mixture was molded and then pressed by 3500 psi to shape, then dried in shade for one day, then dried in an oven at 60° C., and then sintered at 900° C. for 4 hours to obtain a porous material. The porous material had a density of 1.58 g/cm$^3$, a water absorption of 27.88%, a compressive strength of 109 kgf/cm$^2$, a porosity of 26.8%, a pore size of 248.48 micrometers to 724.24 micrometers, and a thermal conductivity of 0.42 W/m·K. The porous material included 47.65 wt % of O, 4.07 wt % of B, 5.35 wt % of Fe, 1.60 wt % of Al, 13.44 wt % of Si, 0.18 wt % of K, 6.09 wt % of Na, 17.87 wt % of Ca, and 3.70 wt % of Mg. As known from the XRD analysis, the porous material had crystalline phases of $Na_2Si(Si_2O_7)$, $CaMgSi_2O_6$, and $CaSiO_3$. As known from Comparative Example 7, the product sintered at too high a temperature had a water absorption that was too high and a compressive strength that was too low.

It will be apparent to those skilled in the art that various modifications and variations can be made to the disclosed methods and materials. It is intended that the specification and examples be considered as exemplary only, with the true scope of the disclosure being indicated by the following claims and their equivalents.

What is claimed is:

1. A porous material, comprising:

3 wt % to 4.2 wt % of Mg;

14 wt % to 18 wt % of Ca;

12 wt % to 15 wt % of Si;

0.8 wt % to 1.5 wt % of Al;

0.1 wt % to 0.3 wt % of K;

0.4 wt % to 2 wt % of Fe;

7 wt % to 8.5 wt % of Na;

4.8 wt % to 7.6 wt % of B; and
48 wt % to 52 wt % of O.

2. The porous material as claimed in claim 1, wherein the porous material has a crystalline phase of $Na_2MgSiO_4$, $Na_2Si(Si_2O_7)$, $CaMgSi_2O_6$, MgO, $CaSiO_3$, or a combination thereof.

3. The porous material as claimed in claim 1, wherein the porous material has a honeycomb structure with a porosity of 13% to 25% and a pore size of 5 micrometers to 450 micrometers.

4. The porous material as claimed in claim 1, wherein the porous material has a compressive strength of 200 $kgf/cm^2$ to 400 $kgf/cm^2$, a density of 1.5 $g/cm^3$ to 1.65 $g/cm^3$, and a water absorption of 5% to 20%.

5. The porous material as claimed in claim 1, wherein the porous structure has a thermal conductivity of 0.4 W/m·K to 0.8 W/m·K, and the porous material has a flame resistance and thermal insulation to a flame of 1000° C. to 1200° C.

6. A method of forming a porous material, comprising:
mixing raw materials, an alkaline activator and a foaming agent to form a mixture, wherein the raw materials comprise 40 wt % to 45 wt % of reducing slag, 10 wt % to 15 wt % of waste flame retardant material, and 40 wt % to 45 wt % of waste glass;
molding the mixture to form a green body; and
sintering the green body to form the porous material as claimed in claim 1, wherein the sintering step is performed at a temperature of 600° C. to 800° C. for a period of 1 hour to 4 hours.

7. The method as claimed in claim 6, wherein the reducing slag comprises:
1 wt % to 10 wt % of Mg;
30 wt % to 45 wt % of Ca;
5 wt % to 20 wt % of Si;
1 wt % to 5 wt % of Al;
0.5 wt % to 1.5 wt % of B;
40 wt % to 50 wt % of O;
0.01 wt % to 0.1 wt % of K;
0.1 wt % to 0.5 wt % of Na; and
0.1 wt % to 1 wt % of Fe.

8. The method as claimed in claim 6, wherein the waste flame retardant material comprises:
20 wt % to 30 wt % of Mg;
20 wt % to 30 wt % of Ca;
1 wt % to 5 wt % of Si;
3 wt % to 4 wt % of Al;
35 wt % to 45 wt % of O;
0.1 wt % to 1 wt % of B;
0.01 wt % to 1 wt % of Na;
0.01 wt % to 1 wt % of K; and
0.5 wt % to 1 wt % of Fe.

9. The method as claimed in claim 6, wherein the waste glass comprises:
45 wt % to 55 wt % of O;
20 wt % to 30 wt % of Si;
1 wt % to 5 wt % of B;
0.1 wt % to 1 wt % of Fe;
1 wt % to 5 wt % of Al;
0.1 wt % to 1 wt % of K;
0.1 wt % to 1 wt % of Mg;
5 wt % to 10 wt % of Na; and
5 wt % to 10 wt % of Ca.

10. The method as claimed in claim 6, wherein the alkaline activator comprises sodium hydroxide, potassium hydroxide, calcium oxide, sodium carbonate, sodium silicate, or a combination thereof, and the foaming agent comprises boric acid, sodium bicarbonate ($NaHNO_3$), sodium perborate ($NaBO_3$), borax, silicon carbide (SiC) or a combination thereof.

11. The method as claimed in claim 6, wherein the raw materials and the alkaline activator have a weight ratio of 100:1 to 100:10, and the raw materials and the foaming agent have a weight ratio of 100:10 to 100:15.

12. The method as claimed in claim 6, wherein the reducing slag is a by-product of metallurgical industry, and the waste flame retardant material is a waste product of high-temperature industrial equipment.

* * * * *